Jan. 23, 1945.  W. P. WILLS  2,367,914
MEASURING APPARATUS
Original Filed Nov. 15, 1938
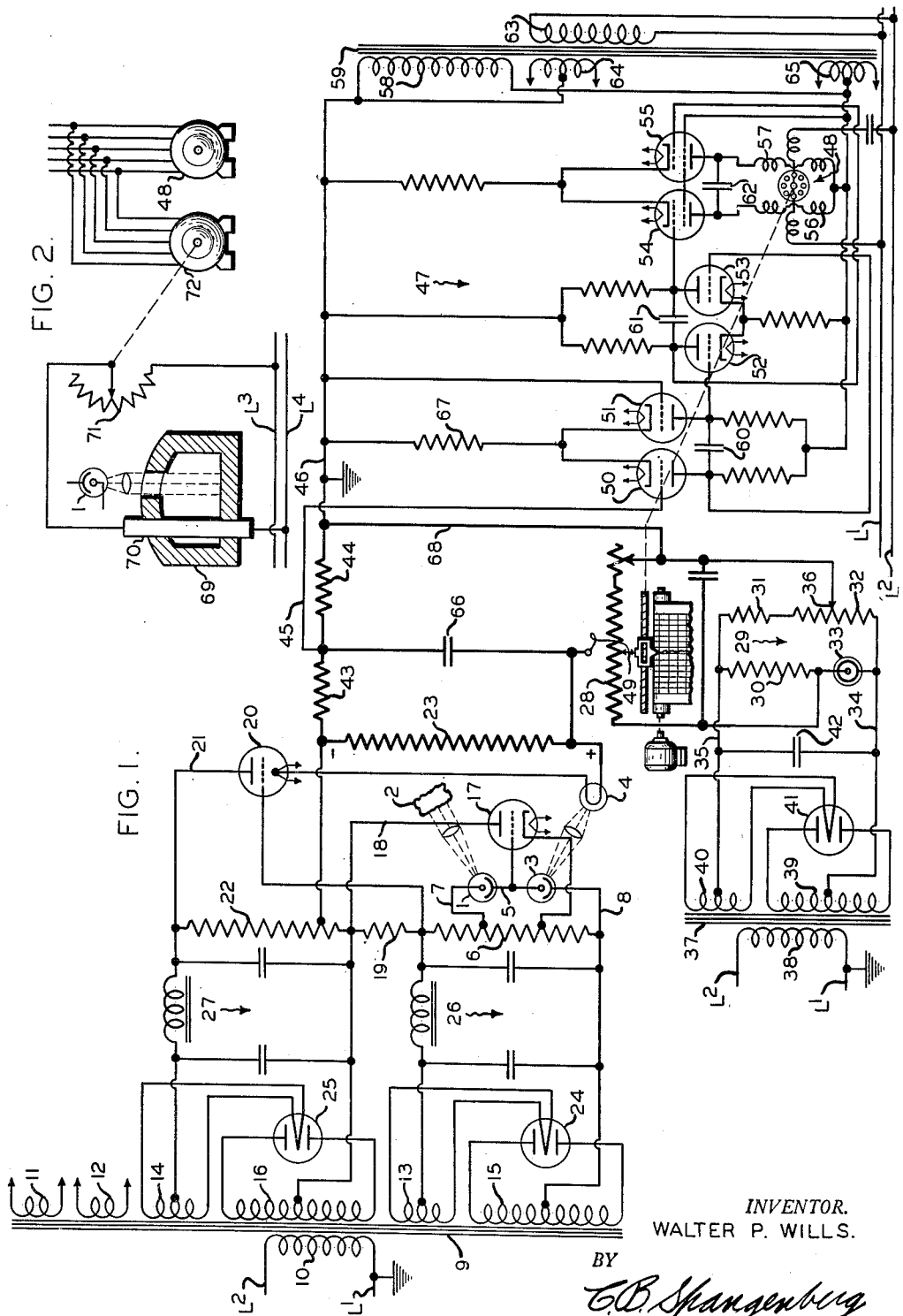
*INVENTOR.*
WALTER P. WILLS.
BY
C. B. Spangenberg
ATTORNEY.

Patented Jan. 23, 1945

2,367,914

UNITED STATES PATENT OFFICE 2,367,914

MEASURING APPARATUS

Walter P. Wills, Philadelphia, Pa., assignor to The Brown Instrument Company, Philadelphia, Pa., a corporation of Pennsylvania Original application November 15, 1938, Serial No. 240,594. Divided and this application September 25, 1942, Serial No. 459,639

14 Claims. (Cl. 171—95)

The present invention relates to apparatus for ascertaining and continuously recording and/or controlling the magnitude of a variable condition, and in particular, to self balancing measuring apparatus which is of especial utility in recording and/or controlling temperature variations in incandescent bodies.

A prior application, Serial No. 240,594, filed November 15, 1938, by Thomas R. Harrison and myself as joint inventors and issued into Patent No. 2,300,742 on November 3, 1942, discloses certain improvements in apparatus of the type referred to above which were not the joint invention of the applicants who made said prior application but were my sole invention and are disclosed and claimed by me in the present application which under the circumstances is to be regarded as a division of said prior application.

In Patent 2,245,034 which was granted on June 10, 1941, to Thomas R. Harrison, a radiant energy responsive apparatus for ascertaining and continuously recording and/or controlling temperature variations in incandescent bodies is disclosed which is adversely affected by supply line voltage changes, temperature and humidity variations and other uncontrollable factors, and in particular, is rendered erratic and unstable in operation thereby.

My present invention is designed to correct this objectionable feature in radiant energy responsive apparatus of the type disclosed in the Harrison patent by means of a certain novel electrical circuit arrangement which is both simple and efficient in rendering the apparatus unresponsive to supply line voltage changes, temperature and humidity variations and other uncontrollable factors to which the apparatus may be subjected.

I have discovered that in the radiant energy responsive apparatus disclosed in the Harrison patent extraneous alternating or fluctuating signals are impressed on the input stage of the electronic amplifier utilized for controlling the operation of the rebalancing motor of the apparatus due to leakage alternating currents which passed through the power transformers in the amplifier by the distributed capacitance in the transformers. The magnitude of the extraneous alternating signals so impressed on the input stage of the Harrison amplifier is not constant but varies with variations in the supply line voltage, the temperature and humidity to which the transformers were subjected and also with other factors peculiar to transformers. This disadvantage of the radiant energy responsive apparatus disclosed in the Harrison patent is avoided according to the present invention by providing a low impedance path in the input circuit of the amplifier through which the extraneous alternating or fluctuating currents, if any, are conducted to the end that such extraneous alternating or fluctuating currents are prevented from adversely affecting the operation of the amplifier and thereby the operation of the rebalancing motor.

Accordingly, it is a specific object of the present invention to provide an improved radiant energy responsive apparatus for ascertaining and continuously recording temperature variations in incandescent bodies which is substantially insensitive to variations in the voltage of the energizing current supply and to variations in temperature and humidity to which the apparatus is subjected.

The various features of novelty which characterize my invention are pointed out with particularity in the claims annexed to and forming a part of this specification. For a better understanding of the invention, however, and the objects attained with its use reference should be had to the accompanying drawing and descriptive matter in which I have illustrated a preferred embodiment of the invention.

Of the drawing:

Fig. 1 is a diagrammatic view illustrating one embodiment of the invention as adapted for use in measuring and recording the temperature of an incandescent body; and Fig. 2 is a diagrammatic representation of the use of the invention in a control system.

Referring now to the drawing, an arrangement is disclosed in Fig. 1 which illustrates the use of my invention in a self-balancing measuring instrument employing a photocell as the condition responsive arrangement. Specifically, the arrangement illustrated comprises a photoelectric pyrometer of the general type disclosed in the Harrison Patent 2,245,034 in which a photocell 1 is arranged to receive light from the interior of a furnace or from an incandescent body 2 and a second photoelectric cell 3 is arranged to receive light from a lamp 4, the illumination of which is adapted to be controlled by means responsive to the relative conductivities of the two photocells. The photocells are arranged in an electrical bridge circuit, and as the temperature of the incandescent body varies, the illumination of lamp 4 is varied until the illumination of the two photocells is balanced. The magnitude of the lamp energizing current will be a measure of the condition and is measured by a self-balancing potentiometric network to be described.

As shown, the two photocells are connected in series relation by a conductor 5 and the series arrangement is connected across a suitable portion of a voltage divider 6 by means of conductors 7 and 8. The photocell 1 is preferably included in a suitable casing (not shown) and the casing is arranged in such a manner that the only light which impinges on the photocell is that which is to be measured. Desirably, the photocell 3 is also suitably enclosed and arranged so that it is subject only to light from the lamp 4.

The voltage divider 6 is energized from a transformer 9 which is a combination step-up and step-down transformer comprising a line voltage primary winding 10, low voltage secondary windings 11, 12, 13 and 14 and high voltage secondary windings 15 and 16. The primary winding 10 is connected to alternating current supply conductors $L^1$ and $L^2$, one of which supply conductors in the usual commercial practice is grounded. The low voltage secondary winding 11 is connected by conductors not shown to the heater filament of an electronic valve 17 and supplies energizing current thereto. Electronic valve 17 is a heater type triode and includes anode, cathode, filament and control electrode elements, and as shown, the anode is connected to the positive terminal of the voltage divider 6 by means of a conductor 18 in which a resistance 19 is inserted, the cathode is connected to a negative point on the voltage divider intermediate points of connection of the conductors 7 and 8 thereto, and the control electrode is connected to the conductor 5 between the two photocells.

The low voltage secondary winding 12 is connected by conductors, not shown, to the heater filament or cathode of a second electronic valve 20 and supplies energizing current to that valve. The valve 20 is a filament type triode and includes anode, cathode and control electrode elements. The anode is connected by a conductor 21 to the positive terminal of a second voltage divider 22 which voltage divider is energized from the transformer 9 in a manner to be described. As shown, the negative terminal of the voltage divider 22 is connected to the anode of the valve 17. A center point on the filament cathode of valve 20 is connected to a point on the voltage divider 22 which is negative with respect to the point of connection of the anode thereto, and has connected in circuit therewith, the filament of lamp 4 and a resistance 23. The lamp 4 is thus arranged to be energized by the flow of output current from valve 20. The control electrode of valve 20 is connected to the positive terminal of the voltage divider 6 so that as the flow of current through valve 17 changes to vary the potential drop across resistance 19, the potential of the control electrode of valve 20 will change with respect to the potential of the filament cathode and the supply of current to lamp 4 will be varied accordingly.

Electronic valves 24 and 25 are also provided which valves may conveniently be full wave rectifier valves and are employed to maintain direct current potentials across the voltage dividers 6 and 22, respectively. The filament cathode of valve 24 is connected to and receives energizing current from the low voltage secondary winding 13 and the anodes thereof are connected to opposite terminals of high voltage secondary winding 15. A center tap on the winding 13 and a center tap on the winding 15 are connected to the input terminals of a suitable filter 26 and the output terminals of the latter are connected to the terminals of the voltage divider 6 so that a steady direct current voltage is maintained across the terminals of the divider.

Similarly, the filament cathode of valve 25 is connected to and receives energizing current from the low voltage winding 14 and the anodes are connected to the opposite terminals of the high voltage winding 16. A center tap on the winding 14 and a center tap on the winding 16 are connected to the input terminals of a filter 27 and the output terminals of the latter are connected to the terminals of the voltage divider 22 so that a steady direct current voltage is maintained across the terminals of the divider.

When light from the incandescent body 2 is focussed on the photocell 1, the latter becomes more conductive and renders the control electrode of valve 17 more positive relatively to the cathode thereof, whereby the current conducted by the valve increases to produce an increase in the potential drop across resistance 19. Thereupon, the control electrode of valve 20 becomes more positive relative to the potential of its associated cathode resulting in an increase in the current conducted by valve 20 and thereby through the lamp 4. As lamp 4 subsequently brightens, the photocell 3 becomes more conductive and drives the control electrode of valve 17 less positive; and, since the latter controls the potential of the control electrode of valve 20, the conductivity of the latter is also reduced. This establishes a balanced condition of the illumination of the two photocells and the energy used by lamp 4 is then an indication of the light being received by the photocell 1.

As previously noted, the current which passes through the lamp 4 also passes through resistance 23 so that a potential drop is maintained across the latter which varies in accordance with the illumination received by photocell 1 and thereby in accordance with the temperature of the incandescent body 2. This potential drop is opposed to and normally balanced by a measured part of the potential drop maintained across a slidewire resistance 28 by a voltage compensating bridge 29, which bridge operates to maintain the potential drop across resistance 28 constant irrespective of variations in the supply line voltage over a substantial range. The voltage compensating bridge 29 is disclosed and claimed in Patent 2,211,114 which was granted to Thomas R. Harrison on August 13, 1940, and includes resistances 30, 31 and 32 in three of its arms and a voltage regulator tube 33 in its remaining arm. Bridge 29 is energized from a suitable direct current source through conductors 34 and 35 which are connected to one pair of conjugate points and the other pair of conjugate points, one of which is the point of engagement of a contact 36 with resistance 32, are connected to the terminals of the slidewire resistance 28. It is noted that variations in the degree of compensation obtained may be effected by adjustment of contact 36 along resistance 32 so that on change in line voltage the change may be exactly compensated, or over compensated, or under compensated, as desired.

The source from which the bridge 29 is energized may be a suitable direct current source, and as illustrated, it may be energized through a suitable rectifier circuit from a transformer 37 which is a combination step-up and step-down transformer having a primary winding 38 connected to the alternating current supply conductors L¹ and L² one of which is grounded, a high voltage secondary winding 39, and a low voltage secondary winding 40. The rectifier circuit referred to may be similar to the rectifier circuits including the valves 24 and 25 and includes a rectifier valve 41 having its filament cathode connected to the terminals of the secondary winding 40 and receiving energizing current therefrom. The anodes of valves 41 are connected to opposite terminals of the secondary winding 39. The conductor 34 is connected to a center tap on the winding 39 and the conductor 35 is connected to a center tap on the winding 40. A condenser 42 is connected between the conductors 34 and 35 for filtering the output current of the rectifier.

A resistance 43 and a resistance 44 are connected in a series circuit with the resistances 23 and 28 so that when the potential drops across the resistances 23 and 28 are not balanced the currents which flow as a result of such unequality will flow through resistances 43 and 44. The terminals of resistance 44 are connected by conductors 45 and 46, the latter of which is grounded, to the input terminals of an electronic amplifier 47 which amplifier operates to amplify any potential drops produced across resistance 44 as a result of the flow of unbalanced currents therethrough and is adapted to selectively control the rotation and direction of rotation of a reversible motor 48 in accordance with the polarity of the potential drop produced across resistance 44. Motor 48 is mechanically connected to a contact 49 which contact is adjustable along resistance 28 for varying the magnitude of the slidewire potential in opposition to the potential drop across resistance 23 so that on a change in the illumination of photocell 1 and thereby in the current flow through resistance 23, the contact 49 will be adjusted to a position along the slidewire corresponding to the value of current through resistance 23.

The electronic amplifier 47 referred to includes a pair of electronic valves 50 and 51 which valves are heater type triodes including anode, cathode, filament and control electrode elements and the output circuits of which are directly coupled to the input terminals of a like pair of valves 52 and 53 which, in turn, have their output circuits directly coupled to the input terminals of a pair of electronic valves 54 and 55. The valves 54 and 55 are heater type tetrodes including anode, cathode, filament, screen and control electrode elements and having respective motor windings 56 and 57 connected in their output circuits.

Anode voltage is supplied the amplifier 47 from the high voltage secondary winding 58 of a transformer 59, and as illustrated, valves 52 and 53 are connected across the terminals of said secondary winding in an inverse manner with respect to the connection of valves 50, 51 and valves 54, 55 thereacross. That is to say, valves 50, 51, 54, 55 and valves 52 and 53 will be conductive only during alternate half cycles of supply line voltage so that the conductivities of valves 52 and 53 will be controlled in accordance with the magnitude of current conducted by valves 50 and 51 during the preceding half cycle and in like manner the conductivities of valves 54 and 55 will be controlled in accordance with the current conducted by valves 52 and 53 during the preceding half cycle. As illustrated, condensers 60, 61 and 62 are provided for each pair of valves, being connected between the anodes of a respective pair of valves for effecting such control of a successive pair of valves during the next later half cycle.

Transformer 59 is a combination step-up and step-down transformer and includes a line voltage primary winding 63 which is connected to the alternating current supply conductors L¹ and L² and low voltage secondary windings 64 and 65 in addition to the high voltage secondary winding 58. The low voltage winding 64 supplies energizing current to the heater filaments of valves 50, 51, 54 and 55, and similarly, winding 65 supplies energizing current to the heater filaments of valves 52 and 53, each of the filaments desirably being connected in parallel across its respective energizing winding. It is noted, separate filament energize windings 64 and 65 are provided because the potentials of the cathodes of valves 50, 51, 54 and 55 are widely displaced from that of the cathodes of valves 52 and 53.

The resistance 43 and condenser 66 connected between the terminal of resistance 43 remote from the resistance 23 and the positive terminal of the latter are provided for preventing overshooting of the balance point and consequent hunting of the system as the reversible electrical motor 48 adjusts the contact 49 to its new balanced position along the slidewire resistance 28 in response to a change in the illumination of the photocell 1. The manner in which this anti-hunting arrangement operates to produce this advantageous result is described in application, Serial No. 240,594, filed November 15, 1939, by Thomas R. Harrison and myself and of which the present application is a division as noted hereinbefore. Therefore, it is believed that further description of this anti-hunting arrangement is unnecessary in the present application to a proper understanding of the present application.

It should be noted that the input circuit of the valve 50 including the resistor 44 may be traced from the cathode of the valve 50 through a biasing resistance 67, to the grounded conductor 46, through resistor 44 and through a conductor 45 to the control electrode of the valve 50. The control electrode of the valve 51 is connected directly to the grounded conductor 46 and through the biasing resistance 67 to the cathode of valve 51. Thus, the potential of the control electrode of valve 50 is arranged to be controlled in accordance with the potential drop across the resistor 44 while the potential of the control electrode of valve 51 is arranged to be controlled only by the potential drop across the cathode biasing resistance 67.

Any alternating or fluctuating currents which may be extraneously introduced into the measuring circuit in which the potential drops across resistors 23 and 28 are opposed from the alternating current energizing conductors L¹ and L² due to distributed capacitance or other leakage effects in the power transformers 9, 37 and 59 will flow from the grounded supply conductor L¹ through the power transformers directly to the grounded conductor 46 without affecting the input circuit of amplifier 47. To this end the resistance of resistor 44 is made large compared to the circuit which shunts resistance 44 and resistors 43, 23 and 28 and a conductor 68. This shunt circuit effectively provides a short circuit path for such alternating or fluctuating currents and thereby effectively prevent their flow through the resistor 44. By so diverting the extraneous alternating or fluctuating currents in the electronic circuit, they are prevented from adversely affecting the operation of the instrument, and in particular, are prevented from rendering the instrument unstable and critical under certain conditions of operation.

As noted previously, the variable potential drop created across the resistance 23 is opposed to and normally balanced by a measured part of the constant potential drop maintained across the slide wire resistance 28. The bridge network 29 and the associated full wave rectifier circuit including elements 34, 35 and 37 through 42 are provided to maintain the constant potential drop across the slidewire resistance 28. The circuit in which the potential drop across resistance 23 is opposed to a part of the potential drop across resistance 28 may be traced from the upper and negative terminal of resistance 23, through the latter to the contact 49 in engagement with the slidewire resistance 28, from the right end of the slidewire resistance 28 through conductor 68 and through resistances 44 and 43 to the upper and negative terminal of the resistance 23. When the two opposed potentials are of exactly the same magnitude, no current will flow through the circuit just traced, and therefore, no potential drop will be produced across the resistance 44. Upon an increase or decrease in the potential drop established across resistance 23, however, a current will flow in one direction or the other through the said circuit to create a potential drop of one polarity or the other across the resistance 44 and having a magnitude varying in accordance with the magnitude of such current flow. The potential drop so established across resistance 44 is utilized to control the potential of the control electrode of the electronic valve 50 and consequently the energization of the motor 48 for rotation in one direction or the other depending upon the polarity of that potential drop. Motor 48 is mechanically coupled to the contact 49 and serves to adjust that contact along the length of the slidewire resistance 28 to increase or decrease the portion of the slidewire potential which is opposed to the potential drop across resistance 23 as required to decrease the flow of current through the resistance 44 to zero. This condition is attained when the magnitude of the slidewire potential connected in opposition to the potential drop across the resistance 23 is exactly equal and opposite to the latter.

Due to distributed capacitance of other leakage effects in the power transformers 9, 37 and 59, alternating or fluctuating currents will flow from the grounded side L' of the alternating current supply conductors through the said transformers and through the resistance 23 and the slidewire resistance 28. These alternating or fluctuating currents are not constant in magnitude but vary with variations in the supply line voltage, the temperature and humidity to which the transformers 9, 37 and 59 are subjected and also vary with other factors which are peculiar to transformers. These extraneously introduced currents, moreover, would adversely affect the operation of the instrument if permitted to flow through the resistance 44 connected in the input circuit of the electronic valve 50. According to the present invention the said extraneously introduced currents are prevented from passing through the resistance 44 and are by-passed to ground through a low impedance circuit which shunts the resistance 44. In this manner the extraneously introduced alternating or fluctuating currents are diverted from the resistance 44 and are prevented from adversely affecting the operation of the instrument.

By way of example, one circuit path through which such extraneous alternating or fluctuating currents may flow is from the grounded supply conductor L' through the transformer 9 to the center tap on the secondary winding 16, and through the lower portion of resistance 22 to the upper and negative terminal of the resistance 23. At this point there two circuit paths which the alternating or fluctuating currents may take in flowing back to ground, namely through the resistances 43 and 44 to the grounded conductor 46 or through the resistance 23, the portion of slide wire resistance 28 to the right of the contact 49, and conductor 68 to the grounded conductor 46. Since the circuit path including resistances 23 and 28 is appreciably lower than that including resistances 43 and 44 however, substantially all of the extraneously introduced alternating or fluctuating currents will flow through the resistance 23 and slidewire resistance 28 to the grounded conductor 46, thereby diverting the extraneously introduced currents from the resistance 44.

Another circuit through which extraneous alternating or fluctuating currents may be introduced into the measuring circuit is from the grounded supply conductor L' through the transformer 37 to the center tap on the secondary winding 39 through conductor 34, resistance 32 of bridge network 29 and conductor 68 back to ground by means of the grounded conductor 46.

A further circuit through which extraneous currents may be introduced is from the grounded supply conductor L' through the transformer 59 to the upper terminal of secondary winding 59 and back to ground by means of the grounded conductor 46.

It will be observed that in each instance the extraneous alternating or fluctuating current flows will be conducted back to ground without flowing through the resistance 44, at least to any significant extent. In other words, the extraneous alternating or fluctuating currents are diverted from resistance 44 and prevented from adversely affecting the operation of the instrument.

It is noted that the magnitude of the leakage alternating or fluctuating currents which may flow through the shunt circuit including conductors 46 and 68 varies in accordance with variations in the distributed capacitance of the transformers 9, 37 and 59 and that the distributed capacitance of the transformers 9, 37 and 59 is not constant in value but varies in magnitude with the temperature and humidity to which the transformers are subjected during the operation of the instrument. In addition, the magnitude of the leakage alternating or fluctuating currents which may flow through the shunt circuit including conductors 46 and 68 varies with changes in the voltage of the alternating current supply lines $L^1$ and $L^2$. All of these factors which tend to cause leakage alternating or fluctuating current flows through the electronic system are practically uncontrollable, and therefore, the simple and novel arrangement of parts provided in the present application for diverting such leakage current flows from the resistance 44 is of considerable practical importance. This result, moreover, has been obtained while maintaining the number of required circuit components at a minimum.

It will be apparent that the motor 48 may be employed to operate a valve for controlling the supply of heating agent to a furnace from which the photocell receives radiation, or desirably, another motor operated together with the motor 48 may be so employed. For example, as shown in Fig. 2, a furnace 69 in the interior of which the photocell 1 is focussed is heated by a resistance 70 which is connected to electric current supply conductors L³ and L⁴ through a rheostat 71, the adjustment of which is effected by a motor 72. The motor 72 may be exactly like motor 48 and is connected in parallel therewith. The mechanical connection of the motor 72 to the rheostat 71 is such as to increase and decrease the supply of electric current to the furnace heating resistance 70 as the illumination of the photocell 1 drops below or rises above a predetermined level.

While in accordance with the provisions of the statutes, I have illustrated and described the best forms of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent is as follows:

1. Measuring apparatus comprising a measuring circuit network subject to having extraneous fluctuating currents abnormally impressed thereon from an external source and a voltage producing device for producing a flow of current through said circuit network, an impedance element connected in said circuit network, a low resistance path included in said circuit network and arranged to by-pass said impedance element, means to exhibit the magnitude of the voltage produced by said device, electrical valve means responsive to the potential drop produced across said impedance element, said electrical valve means having an output circuit connected to said exhibiting means and an input circuit, and means connecting the terminals of said impedance element to the input circuit of said electrical valve means, the impedance of said impedance element being relatively high compared to the impedance of the by-pass path of said measuring circuit network whereby extraneous fluctuating currents impressed on the measuring circuit by-pass said impedance element and do not affect the operation of said electrical valve means.

2. Measuring apparatus comprising a balanceable measuring circuit network subject to having extraneous fluctuating currents abnormally impressed thereon from an external source and means for producing a flow of unbalanced current through said circuit network, a first impedance connected in said circuit network, a low impedance path included in said circuit network and arranged to by-pass said first impedance, a second impedance connected in said circuit network adapted to be adjusted to rebalance said circuit network, means to adjust said adjustable impedance, electrical valve means responsive to the potential drop produced across said first impedance, said electrical valve means having an output circuit connected to said adjusting means and an input circuit, and means connecting the terminals of said first impedance to the input circuit of said electrical valve means, the impedance of said first impedance being relatively high compared to the impedance of the by-pass path of said measuring circuit network whereby extraneous fluctuating currents impressed on the measuring circuit network by-pass said first impedance and do not affect the operation of said electrical valve means.

3. Measuring apparatus comprising a balanceable measuring circuit network subject to having extraneous fluctuating currents abnormally impressed thereon from an external source and a voltage producing device for producing a flow of unbalanced current through said circuit network, a first impedance connected in said circuit network, a low impedance path included in said circuit network and arranged to by-pass said first impedance, a second impedance connected in said circuit network adapted to be adjusted to rebalance said circuit network and having one terminal connected to one terminal of said first impedance, said common terminal being connected to ground, means to adjust said adjustable impedance, electrical valve means responsive to the potential drop produced across said first impedance, said electrical valve means having an output circuit connected to said adjusting means and an input circuit, and means connecting the terminals of said first impedance to the input circuit of said electrical valve means, the impedance of said first impedance being relatively high compared to the impedance of the by-pass path of said measuring circuit network whereby extraneous fluctuating currents impressed on the measuring circuit network and tending to flow to ground by-pass said first impedance and do not affect the operation of said electrical valve means.

4. Measuring apparatus comprising a balanceable measuring circuit network subject to having extraneous fluctuating currents abnormally impressed thereon from an external source and means for producing a flow of unbalanced current through said circuit network, a first impedance connected in said circuit network, a low impedance path included in said circuit network and arranged to by-pass said first impedance, a second impedance connected in said circuit network adapted to be adjusted to rebalance said circuit network, a reversible motor to adjust said adjustable impedance, electrical valve means responsive to the potential drop produced across said first impedance, said electrical valve means having an output circuit connected to said motor for controlling the operation of the latter and an input circuit, and means connecting the terminals of said first impedance to the input circuit of said electrical valve means, the impedance of said first impedance being relatively high compared to the impedance of the by-pass path of said measuring circuit whereby extraneous fluctuating currents impressed on the measuring circuit network by-pass said first impedance and do not affect the operation of said electrical valve means.

5. Measuring apparatus comprising a measuring circuit network subject to having extraneous fluctuating currents abnormally impressed thereon from an external source and a voltage producing device for producing a flow of current through said circuit network, an impedance element connected in said circuit network, a low resistance path included in said circuit network and arranged to by-pass said impedance element, means to exhibit the magnitude of the voltage produced by said device, electrical valve means responsive to the potential drop produced across said impedance element, said electrical valve means having an output circuit connected to said exhibiting means and an input circuit, and a connection of substantially constant impedance connecting the terminals of said impedance element to the input circuit of said electrical valve means, the impedance of said impedance element being relatively high compared to the impedance of the by-pass path of said measuring circuit network whereby extraneous fluctuating currents impressed on the measuring circuit network by-pass said impedance element and do not affect the operation of said electrical valve means.

6. Measuring apparatus comprising a balanceable measuring circuit network subject to having extraneous fluctuating currents abnormally impressed thereon from on external source and means for producing a flow of unbalanced current through said circuit network, a first impedance connected in said circuit network, a low impedance path included in said circuit network and arranged to by-pass said first impedance, a second impedance connected in said circuit network adapted to rebalance said circuit network, means to adjust said adjustable impedance, electrical valve means responsive to the potential drop produced across said first impedance, said electrical valve means having an output circuit connected to said adjusting means and an input circuit, and a connection of substantially constant impedance connecting the terminals of said first impedance to the input circuit of said electrical valve means, the impedance of said first impedance being relatively high compared to the impedance of the by-pass path of said measuring circuit network whereby extraneous fluctuating currents impressed on the measuring circuit network by-pass said first impedance and do not affect the operation of said electrical valve means.

7. Measuring apparatus including a source of alternating current one terminal of which is grounded, a balanceable measuring circuit network and means responsive to change in magnitude of a variable condition for unbalancing said measuring circuit network to an extent corresponding with said change, said responsive means including power transformer means having a primary winding connected to said alternating current supply source, a first impedance connected in said circuit network, a low impedance path included in said circuit network and arranged to by-pass said first impedance, a second impedance connected in said circuit network adapted to be adjusted to rebalance said circuit network and having one terminal common with one terminal of said first impedance, said common terminal being connected to ground, means to adjust said adjustable impedance, electrical valve means responsive to said potentiometric unbalance for continuously controlling said adjusting means, said electrical valve means having an output circuit connected to control said adjusting means and an input circuit, and means connecting the terminals of said first impedance to the input circuit of said electrical valve means, the impedance of said first impedance being relatively high compared to the impedance of the by-pass path of said measuring circuit whereby extraneous fluctuating currents introduced into the measuring circuit as a result of leakage between said power transformer primary and secondary windings by-pass said first impedance to ground and do not affect the operation of said electrical valve means.

8. Measuring apparatus including a source of alternating current one terminal of which is grounded, a balanceable measuring circuit network and a unidirectional voltage producing device connected in said circuit network responsive to change in magnitude of a variable condition for unbalancing said measuring circuit network to an extent corresponding with said change to produce a direct current flow in said circuit network, said current producing device including power transformer means having a primary winding connected to said alternating current supply source, a first impedance connected in said circuit network through which said unbalanced direct currents flow to produce a potentional drop thereacross corresponding to the direction and extent of potentiometric unbalance, a low impedance path included in said circuit network and arranged to by-pass said first impedance, a second impedance connected in said circuit network adapted to be adjusted to rebalance said circuit network and having one terminal connected to one terminal of said first impedance, said common terminal being connected to ground, a reversible electrical motor adapted to adjust said adjustable impedance, electrical valve means responsive to said current flow for continuously controlling said motor, said electrical valve means having an output circuit connected to said reversible electrical motor and an input circuit, and means connecting the terminals of said first impedance to the input circuit of said electrical valve means, the impedance of said first impedance and of said device being relatively high compared to the impedance of the by-pass path of said measuring circuit network whereby extraneous fluctuating current introduced into the measuring circuit as a result of leakage between the power transformer primary and secondary windings of said current producing device by-pass said first impedance to ground and do not affect the operation of said motor.

9. Measuring apparatus comprising a potentiometric measuring circuit network subject to having extraneous fluctuating currents abnormally impressed thereon from an external source and a voltage producing device responsive to change in magnitude of a variable condition for unbalancing said potentiometric measuring circuit network to an extent corresponding with said change, an impedance element connected in said circuit network, a low resistance path included in said circuit network and arranged to by-pass said impedance element, means to exhibit the magnitude of the voltage produced by said device, electrical valve means responsive to said potentiometric unbalance for continuously controlling said exhibiting means, said electrical valve means having an output circuit connected to said exhibiting means and an input circuit, and a connection of substantially constant impedance connecting the terminals of said impedance element to the input circuit of said electrical valve means, the impedance of said impedance element being relatively high compared to the impedance of the by-pass path of said potentiometric measuring circuit network whereby extraneous fluctuating currents impressed on the potentiometric measuring circuit network by-pass said impedance element and do not affect the operation of said electrical valve means.

10. Measuring apparatus comprising a potentiometric measuring circuit network subject to having extraneous fluctuating currents abnormally impressed thereon from an external source and a voltage producing device responsive to change in magnitude of a variable condition for unbalancing said potentiometric measuring circuit network to an extent corresponding with said change, a first impedance connected in said circuit network, a low impedance path included in said circuit network and arranged to by-pass said first impedance, a second impedance connected in said circuit network adapted to be adjusted to rebalance said circuit network and having one terminal connected to one terminal of said first impedance, means to adjust said adjustable impedance, electrical valve means responsive to said potentiometric unbalance for continuously controlling said adjusting means, said electrical valve means having an output circuit connected to control said adjusting means and an input circuit, and a connection of substantially constant impedance connecting the terminals of said first impedance to the input circuit of said electrical valve means, the impedance of said first impedance being relatively high compared to the impedance of the by-pass path of said potentiometric measuring circuit network whereby extraneous fluctuating currents impressed on the potentiometric measuring circuit network and tending to flow to the common terminal of said impedance by-pass said first impedance and do not affect the operation of said electrical valve means.

11. Measuring apparatus comprising a potentiometric measuring circuit network subject to having extraneous fluctuating currents abnormally impressed thereon from an external source and a unidirectional voltage producing device connected in said circuit responsive to change in magnitude of a variable condition for unbalancing said potentiometric measuring circuit network to an extent corresponding with said change to produce unbalanced direct current flows in said circuit network, a first impedance connected in said circuit network through which said unbalanced direct currents flow to produce a potential drop thereacross corresponding to the direction and extent of the potentiometric unbalance, a low impedance path included in said circuit network and arranged to by-pass said first impedance, a second impedance connected in said circuit network adapted to be adjusted to rebalance said circuit network and having one terminal connected to one terminal of said first impedance, a reversible electrical motor adapted to adjust said adjustable impedance, electrical valve means responsive to said potentiometric unbalance for continuously controlling said motor, said electrical valve means having an output circuit connected to said reversible electrical motor and an input circuit, and a connection of substantially constant impedance connecting the terminals of said first impedance to the input circuit of said electrical valve means, the impedance of said first impedance being relatively high compared to the impedance of the by-pass path of said potentiometric measuring circuit network whereby extraneous fluctuating currents impressed on the potentiometric measuring circuit network and tending to flow to the common terminal of said impedance by-pass said first impedance and do not affect the operation of said electrical valve means.

12. Measuring apparatus comprising a potentiometric measuring circuit network subject to having extraneous fluctuating currents abnormally impressed thereon from an external source and a voltage producing device responsive to change in magnitude of a variable condition for unbalancing said potentiometric measuring circuit network to an extent corresponding with said change, a first impedance connected in said circuit network, a by-pass path for said first impedance including said device and a second impedance connected in said circuit network adapted to be adjusted to rebalance said circuit network and having one terminal common with one terminal of said first impedance, said common terminal being connected to ground, a reversible electrical motor adapted to adjust said adjustable impedance, electrical valve means responsive to said potentiometric unbalance for continuously controlling said motor, said electrical valve means having an output circuit connected to said reversible electrical motor and an input circuit, and a connection of substantially constant impedance connecting the terminals of said first impedance to the input circuit of said electrical valve means, the impedance of said adjustable impedance and of said device being relatively small compared to the impedance of said first impedance whereby substantially all extraneous fluctuating currents impressed on the potentiometric measuring circuit network and tending to flow to ground by-pass said first impedance and do not affect the operation of said motor.

13. Measuring apparatus including a source of alternating current one terminal of which is grounded, a potentiometric measuring circuit network and a voltage producing device responsive to change in magnitude of a variable condition for unbalancing said potentiometric measuring circuit network to an extent corresponding with said change, said voltage producing device including power transformer means having a primary winding connected to said alternating current supply source, a first impedance connected in said circuit network, a by-pass path for said first impedance including a second impedance connected in said circuit network adapted to be adjusted to rebalance said circuit network and having one terminal common with one terminal of said first impedance, said common terminal being connected to ground, means to adjust said adjustable impedance, electrical valve means responsive to said potentiometric unbalance for continuously controlling said adjusting means, said electrical valve means having an output circuit connected to control said adjusting means and an input circuit, and a connection of substantially constant impedance connecting the terminals of said first impedance to the input circuit of said electrical valve means, the impedance of said first impedance being relatively high compared to the impedance of the by-pass path of said potentiometric measuring circuit whereby extraneous fluctuating currents introduced into the potentiometric measuring circuit network as a result of leakage between the power transformer primary and secondary windings of said voltage producing device by-pass said first impedance to ground and do not affect the operation of said electrical valve means.

14. Measuring apparatus including a source of alternating current one terminal of which is grounded, a potentiometric measuring circuit network and a unidirectional voltage producing device connected in said circuit network responsive to change in magnitude of a variable condition for unbalancing said potentiometric measuring circuit network to an extent corresponding with said change to produce unbalanced direct current flows in said circuit network, said voltage producing device including power transformer means having a primary winding connected to said alternating current supply source, a first impedance connected in said circuit network through which said unbalanced direct currents flow to produce a potential drop thereacross corresponding to the direction and extent of potentiometric unbalance, a by-pass path for said first impedance including a second impedance connected in said circuit network adapted to be adjusted to rebalance said circuit network and having one terminal common with one terminal of said first impedance, said common terminal being connected to ground, a reversible electrical motor adapted to adjust said adjustable impedance, electrical valve means responsive to said potentiometric unbalance for continuously controlling said motor, said electrical valve means having an output circuit connected to said reversible electrical motor and an input circuit, and a connection of substantially constant impedance connecting the terminals of said first impedance to the input circuit of said electrical valve means, the impedance of said first impedance being relatively high compared to the impedance of the by-pass path of said potentiometric measuring circuit network whereby extraneous fluctuating current introduced into the potentiometric measuring circuit network as a result of distributed capacitance between the power transformer primary and secondary windings of said voltage producing device by-pass said first impedance to ground and do not affect the operation of said motor.

WALTER P. WILLS.